(12) United States Patent
Alger et al.

(10) Patent No.: US 9,838,274 B2
(45) Date of Patent: *Dec. 5, 2017

(54) METHOD FOR ENHANCING SECURITY ACCESS TO A NODE IN A HOMOGENOUS CLOUD COMPUTING ENVIRONMENT

(71) Applicant: International Business Machines Corporation, Armonk, NY (US)

(72) Inventors: Joshua A. Alger, Raleigh, NC (US); Jeffrey R. Hoy, Southern Pines, NC (US); Barry J. Pellas, Durham, NC (US); David M. Stecher, Seattle, WA (US)

(73) Assignee: International Business Machines Corporation, Armonk, NY (US)

( * ) Notice: Subject to any disclaimer, the term of this patent is extended or adjusted under 35 U.S.C. 154(b) by 161 days.

This patent is subject to a terminal disclaimer.

(21) Appl. No.: 14/547,880

(22) Filed: Nov. 19, 2014

(65) Prior Publication Data

US 2016/0142334 A1    May 19, 2016

(51) Int. Cl.
*H04L 12/24* (2006.01)
*H04L 12/915* (2013.01)
(Continued)

(52) U.S. Cl.
CPC ...... *H04L 41/5041* (2013.01); *H04L 41/0803* (2013.01); *H04L 47/785* (2013.01);
(Continued)

(58) Field of Classification Search
CPC ....... H04L 47/70; H04L 9/30; H04L 63/1466; H04L 63/0815; H04L 63/083;
(Continued)

(56) References Cited

U.S. PATENT DOCUMENTS 6,178,511 B1    1/2001  Cohen et al.
7,269,665 B2 *  9/2007  Pauly ............... G06Q 30/06
                                                    709/245
(Continued)

FOREIGN PATENT DOCUMENTS

CN    102984252    3/2013

OTHER PUBLICATIONS

Jungles, P.; 2012, Mitigating pass-the-hash (PtH) attacks and other creadential theft teachniques.*

(Continued)

*Primary Examiner* — Backhean Tiv
(74) *Attorney, Agent, or Firm* — Terrile, Cannatti, Chambers & Holland, LLP; Stephen A. Terrile (57) ABSTRACT

A method, system and computer-usable medium are disclosed for controlling access to a node deployed in a cloud environment. A new node, based upon a common image, is created in a cloud computing environment. A unique set of randomized system parameters are then generated for the new node, which is then mapped to a set of generic system parameters. A request to access the new node is intercepted, which contains the generic system parameters. The intercepted access request is then parsed to extract the set of generic system parameters, which are then replaced with the unique set of randomized system parameters associated with the target node to generate a modified access request. The modified access request is then forwarded to the target node.

14 Claims, 5 Drawing Sheets

(51) Int. Cl.
*H04L 29/08* (2006.01)
*H04W 4/00* (2009.01)
*H04L 29/06* (2006.01)

(52) U.S. Cl.
CPC ...... *H04L 63/1466* (2013.01); *H04L 67/1031* (2013.01); *H04W 4/003* (2013.01); *H04L 63/10* (2013.01)

(58) Field of Classification Search
CPC .............. G06F 21/34; G06F 2211/007; G06F 2211/008; G06F 2221/2141; G06F 12/1408; G06F 21/31
See application file for complete search history.

(56) References Cited

U.S. PATENT DOCUMENTS

| | | | | |
|---|---|---|---|---|
| 7,877,511 | B1* | 1/2011 | Berger | G06F 17/30067 709/201 |
| 9,059,987 | B1* | 6/2015 | Lofland | H04L 63/0815 |
| 2003/0018919 | A1* | 1/2003 | Arbab | H04L 63/0815 726/5 |
| 2006/0047969 | A1* | 3/2006 | Goertzen | G06F 21/335 713/185 |
| 2006/0190991 | A1* | 8/2006 | Iyer | H04L 63/083 726/3 |
| 2006/0294392 | A1* | 12/2006 | Veprek | G06F 21/31 713/183 |
| 2010/0199086 | A1* | 8/2010 | Kuang | H04L 63/0869 713/155 |
| 2010/0199100 | A1* | 8/2010 | Goertzen | G06F 21/31 713/185 |
| 2011/0191592 | A1* | 8/2011 | Goertzen | G06F 21/36 713/182 |
| 2012/0311157 | A1 | 12/2012 | Erickson et al. | |
| 2013/0132440 | A1* | 5/2013 | Carlson | G06Q 10/06 707/792 |
| 2013/0139222 | A1* | 5/2013 | Kirillin | H04L 67/02 726/4 |
| 2013/0159195 | A1* | 6/2013 | Kirillin | G06Q 20/322 705/71 |
| 2013/0254856 | A1* | 9/2013 | Krishan | H04L 63/083 726/6 |
| 2013/0311894 | A1 | 11/2013 | Rexer et al. | |
| 2013/0333051 | A1* | 12/2013 | Takenouchi | G06F 21/60 726/26 |
| 2014/0020072 | A1* | 1/2014 | Thomas | H04L 63/0815 726/7 |
| 2014/0149746 | A1* | 5/2014 | Yau | G06F 21/35 713/185 |
| 2015/0281225 | A1* | 10/2015 | Schoen | H04L 63/06 726/9 |
| 2016/0005032 | A1* | 1/2016 | Yau | G06Q 20/3678 705/69 |
| 2016/0036806 | A1* | 2/2016 | Aguilar-Macias | G06F 21/46 726/8 |
| 2016/0142411 | A1* | 5/2016 | Alger | H04L 63/1466 709/225 |
| 2016/0164863 | A1* | 6/2016 | Hitchcock | H04L 63/0884 726/10 |
| 2016/0261411 | A1* | 9/2016 | Yau | H04W 4/008 |

OTHER PUBLICATIONS

A. Buecker et al., IBM, Cloud Security Guidance—IBM Recommendations for the Implementation of Cloud Security, 2009.
L. Chung-Sheng et al., IBM, A Sweeping Approach to Security, 2012.
List of IBM Patents or Applications Treated as Related.
U.S. Appl. No. 14/819,751, filed Aug. 6, 2015.

* cited by examiner

| System: | node5 502 | | |
|---|---|---|---|
| Parameter 504 | Type 506 | Virtual Value 508 | Node Value 510 |
| root password | user password | cloudpassword | •••••••••••• |
| virtuser password | user password | cloudpassword2 | ••••••••• |
| opt path | system path | /cloudopt | /PURE4328743634opt |
| app key | file text | appkey | PURE4328743634 |
| | | | |
| System: | node6 512 | | |
| Parameter 514 | Type 516 | Virtual Value 518 | Node Value 520 |
| root password | user password | cloudpassword | •••••••••••• |
| virtuser password | user password | cloudpassword2 | ••••••••• |
| opt path | system path | /cloudopt | /PURE34734873opt |
| app key | file text | appkey | PURE34734873 |

METHOD FOR ENHANCING SECURITY ACCESS TO A NODE IN A HOMOGENOUS CLOUD COMPUTING ENVIRONMENT

BACKGROUND OF THE INVENTION

Field of the Invention

The present invention relates in general to the field of computers and similar technologies, and in particular to software utilized in this field. Still more particularly, it relates to a method, system and computer-usable medium for controlling access to a resource deployed in a cloud environment.

Description of the Related Art

Cloud computing environments offer a flexible, cost-effective, and dependable delivery platform for providing information technology (IT) services over the Internet. In particular, these cloud computing environments allow resources to be rapidly deployed and easily scaled. Likewise, a broad variety of processes, applications, and services can be provisioned on demand, regardless of the user location or device. As a result, cloud computing environments give organizations the opportunity to increase their service delivery efficiencies, streamline IT management, and better align IT services with dynamic business requirements.

While cloud computing environments offer many benefits, they also present an added level of risk because essential services are often outsourced to a third party. This externalized aspect of outsourcing makes it more difficult to maintain data integrity and privacy. As an example, the proliferation of common images opens a security threat to a homogenous cloud computing environment. More specifically, if all common images use the same passwords and file paths, then an attack that compromises one node would compromise all nodes within the cloud computing environment.

Known approaches to mitigating broad attacks include having nodes in a cloud computing environment modifying each system with unique attributes such as user password and secure shell (SSH) hash keys. Other approaches for "heterogenizing" a cloud computing environment include deploying applications to unique file paths on each node, putting unique application passwords on each node, or using mixed hardware for the systems (e.g., x86 vs. PowerPC processor architectures). However, such a heterogeneous environment would require administrators to track these unique aspects, which in turn could create operational issues stemming from misinterpreted passwords, wrong file paths, and so forth.

SUMMARY OF THE INVENTION

A method, system and computer-usable medium are disclosed for controlling access to a resource (e.g., a node) deployed in a cloud environment. In various embodiments, a resource is created in a cloud computing environment. In these and other embodiments, the newly-created resource is based upon a common image and is configured to be homogeneous with other nodes deployed within the cloud computing environment. A unique set of randomized system parameters is then generated for the new node, which in turn is mapped to a set of generic system parameters.

A request to access the resource is intercepted, which contains the generic system parameters. The intercepted access request is then parsed to extract the set of generic system parameters, which is then replaced with the unique set of randomized system parameters associated with the target resource to generate a modified access request. The modified access request is then forwarded to the target resource.

In one embodiment, a response from the resource is intercepted and a predetermined subset of the unique set of randomized system parameters is replaced with a predetermined subset of the generic system parameters. In another embodiment, the unique set of randomized system parameters is changed at the resource to a temporary set of system parameters for the duration of a user session. In yet another embodiment, the unique set of randomized system parameters is reset for a predetermined set of resources within the cloud computing environment.

BRIEF DESCRIPTION OF THE DRAWINGS

The present invention may be better understood, and its numerous objects, figures and advantages made apparent to those skilled in the art by referencing the accompanying drawings. The use of the same reference number throughout the several figures designates a like or similar element.

DETAILED DESCRIPTION

A method, system and computer-usable medium are disclosed for controlling access to a resource deployed in a cloud environment. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
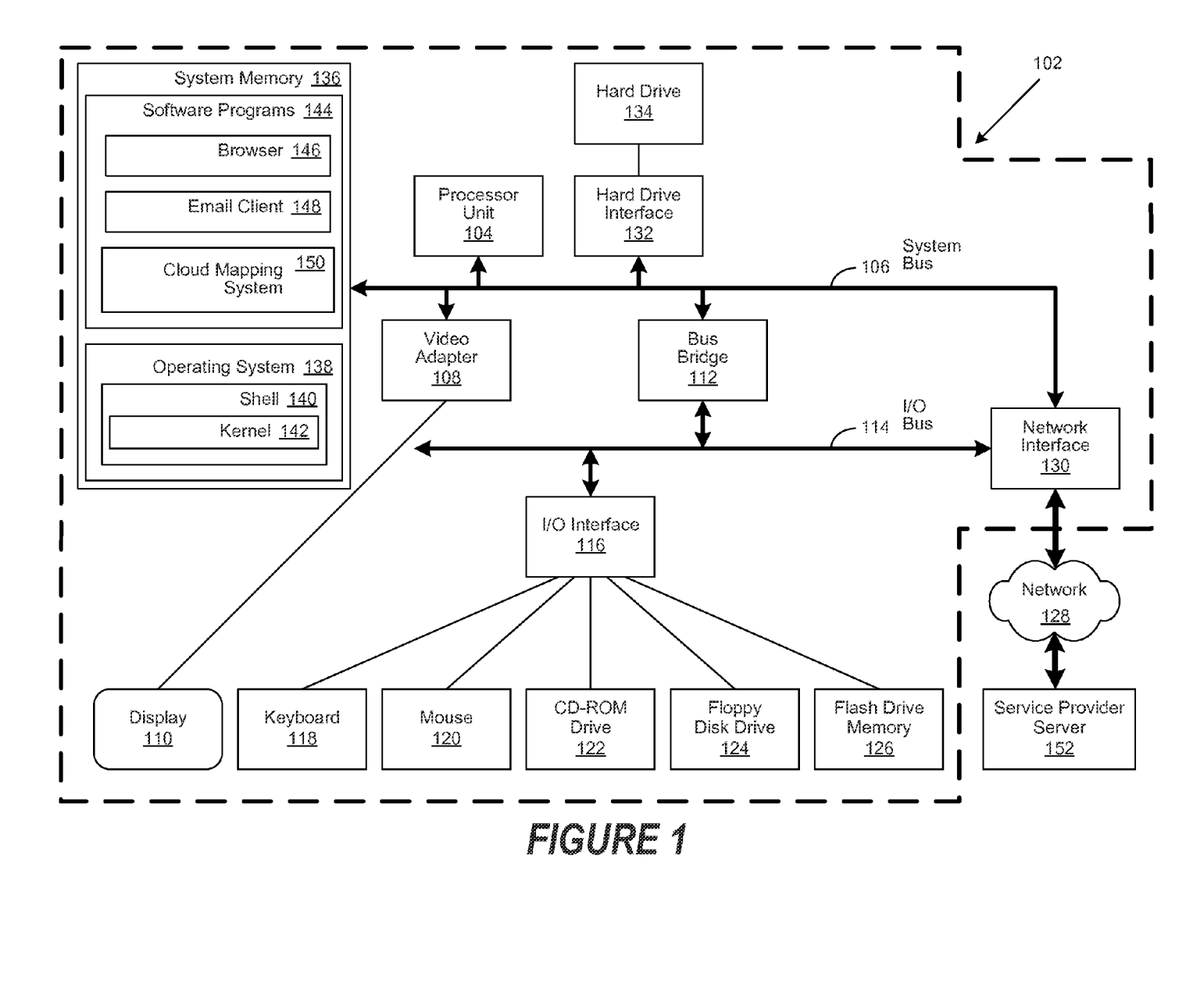
FIG. 1 depicts an exemplary client computer in which the present invention may be implemented.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. In various embodiments, software programs 144 may also include a cloud mapping system 150. In these and other embodiments, the cloud mapping system 150 includes code for implementing the processes described hereinbelow. In one embodiment, client computer 102 is able to download the cloud mapping system 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

Figure 2:
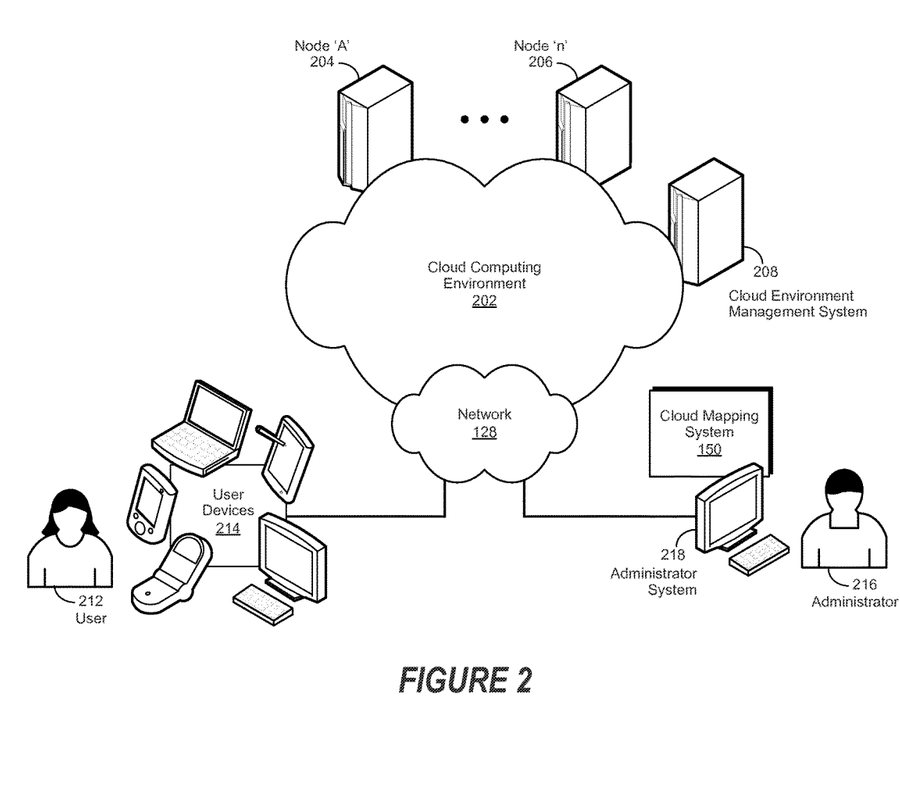
FIG. 2 is a generalized block diagram of a cloud computing environment.

FIG. 2 is a generalized block diagram of a cloud computing environment implemented in accordance with an embodiment of the invention. In various embodiments, the cloud computing environment 202, also referred to herein as a cloud environment 202, is accessed through a network 128. In certain embodiments, the network 128 used to access the cloud computing environment 202 may be the Internet, an intranet, or a hybrid of the two. As shown in FIG. 2, the cloud computing environment 202 may include a plurality of nodes, such as node 'A' 204 through 'n' 206, which are accessed by a user 212 through the use of one or more user devices 214. In various embodiments, nodes 'A' 204 through 'n' 206 are based upon a common image and are homogeneous in their configuration. In certain embodiments, nodes 'A' 204 through 'n' 206 are managed by a cloud environment management system 208, which in turn is managed by an administrator 216 through the use of an associated administrator system 218. In various embodiments, the administrator system 218 is implemented with a cloud mapping system 150.

As used herein, a node, such as nodes 'A' 204 through 'n' 206, broadly refers to a processing location within the cloud computing environment 202. In various embodiments, each node may generally be considered a resource to process data such as a computer or any other device configured to process data. In these embodiments, the node has a unique address. In certain embodiments, the address may be a Data Link Control (DLC) address, a Media Access Control (MAC) address, a physical address, a network address, a logical address, or some combination thereof.

Skilled practitioners of the art will be aware that the cloud computing environment 202 may be implemented in a public, private or hybrid model. Public models include Software as a Service (SaaS) clouds, such as IBM® LotusLive®, available from International Business Machines, of Armonk, N.Y., Platform as a Service (PaaS) clouds, such as Amazon Web Services®, available from Amazon.com of Seattle, Wash., and Security and Data Protection as a Service (SDPaaS) clouds, such as IBM® Security Event and Log Management Services.

In contrast, private clouds are owned and used by a single organization. As such, they offer many of the same benefits as public clouds, but typically give the owner organization greater flexibility and control. Furthermore, private clouds may provide lower latency than public clouds during peak traffic periods. Many organizations embrace both public and private cloud computing by integrating the two models into hybrid clouds. These hybrid cloud computing environments are designed to meet specific business and technology requirements, helping to optimize security and privacy with a minimum investment in fixed IT costs.

Other aspects related to cloud computing environments 202 include the reassessment of security and risk due to the sharing of infrastructure. In particular, users spanning different corporations and trust levels often interact with the same set of computing resources. At the same time, workload balancing, changing service level agreements, and other aspects of today's dynamic IT environments create even more opportunities for misconfiguration, data compromise, and malicious conduct. Likewise, security processes that were once visible are now hidden behind layers of abstraction. This lack of visibility can create a number of security and compliance issues. Furthermore, it is often difficult to physically locate where data is stored inside the cloud computing environment 202.

In various embodiments, randomization approaches familiar to those of skill in the art are implemented to generate a unique set of randomized system parameters for a node, such as node 'A' 204 through 'n' 206, when it is deployed in the cloud computing environment 202. As used herein, the term "randomized" broadly refers to a lack of pattern or predictability. The method by which the unique set of randomized system parameters is generated is a matter of design choice. In various embodiments, the unique set of randomized system parameters may include a unique user password, userID, and file path. In certain embodiments, the unique set of randomized system parameters may be associated with predetermined file contents, hardware and network configurations, operating system libraries, and middleware interactions. Skilled practitioners of the art will realize that many such unique sets of randomized system parameters are possible and the foregoing is not intended to limit the spirit, scope or intent of the invention.

In various embodiments, the resulting unique set of randomized system parameters are then mapped to a set of generic system parameters in the cloud mapping system 150. Thereafter, the set of generic system parameters is used by an administrator 216 when connecting to a system associated with a target node (e.g., nodes 'A' 405 through 'n' 206) using, for example, Secured Shell (SSH). In various embodiments, the cloud mapping system 150 also intercepts output from the system associated with the target node, and rewrites values such as "cloudpassword" into the actual password for that system. In certain embodiments, the cloud mapping application 150 also intercepts output from the system associated with the target node, and rewrites actual system parameter values (e.g., the path "/PURE438967438967opt/IBM") into a predetermined generic system parameter (e.g., as the path "/cloudopt/IBM"), which is then provided to the administrator 216.

In one embodiment, the cloud mapping system 150 intercepts and rewrites the input and output system parameter values by using a modified SSH that captures predetermined input and output text before rendering it to an administrator 216. In another embodiment, the cloud mapping system 150 intercepts and rewrites the input and output system parameter values by using an unmodified SSH, whose operation is not displayed, in combination with a secondary display that converts the displayed SSI-1 text and input/output system parameter values into the mapped result.

In yet another embodiment, the cloud mapping system 150 intercepts and rewrites the input and output system parameter values by providing temporary remappings for the system during a user (e.g., an administrative) session. For example, if an administrator 216 is going to log into a target node (e.g., node 'A' 204 through 'n' 206), the cloud mapping system 150 first connects to the target node and then changes its password to "cloudpassword." The password for the target node is then changed back after the administrative session ends. In various embodiments, file paths are managed through the use of soft links familiar to those of skill in the art.

In certain embodiments, stored file paths are scanned and rewritten after the administrator 216 logs off of the target node. In various embodiments, additional steps are implemented to correspond with various differences in the cloud computing environment 202. In certain embodiments, the administrator can trigger a system-wide reset of system parameter values for each node (e.g., node 'A' 204 through 'n' 206) in the cloud computing environment 202 if a security breach is suspected or detected. In these embodiments, the reset does not affect the various nodes of the cloud computing environment 202 due to the implementation of the meta-login described in greater detail herein.

In various embodiments, the cloud mapping system 150 is implemented to maintain predetermined unique aspects of each node (e.g., nodes 'A' 204 through 'n' 206) in the cloud computing environment. In certain embodiments, the cloud mapping system 150 is implemented to collect unique aspects of each node (e.g., nodes 'A' 204 through 'n' 206) in the cloud computing environment. In various embodiments, the unique aspects include associated security-related system control parameters, such as limited nodes stored, limited time stored, and so forth.

In various embodiments, the cloud mapping system 150 is implemented to rewrite input received from a user (e.g., user 212, administrator 216, etc.) to a target node (e.g., nodes 'A' 204 through 'n' 206). In certain embodiments, the cloud mapping system 150 is implemented to rewrite output provided to a user (e.g., user 212, administrator 216, etc.) by a target node (e.g., nodes 'A' 204 through 'n' 206). In various embodiments, the cloud mapping system 150 is implemented to modify text received from a. target node (e.g., nodes "A" 204 through 'n' 206) before it is displayed to a user (e.g., user 212, administrator 216, etc.).

In certain embodiments, the cloud mapping system 150 is implemented to modify system parameters associated with a target node (e.g., nodes 'A' 204 through 'n' 206) in preparation of a user (e.g., user 212, administrator 216, etc.) connecting. In certain embodiments, the cloud mapping system 150 is implemented to enable reset of predetermined system parameters for all nodes (e.g., nodes 'A ' 204 through 'n' 206) in the cloud computing environment 202. Skilled practitioners of the art will recognize that many such embodiments are possible and the foregoing is not intended to limit the spirit, scope or intent of the invention.

Figure 3:
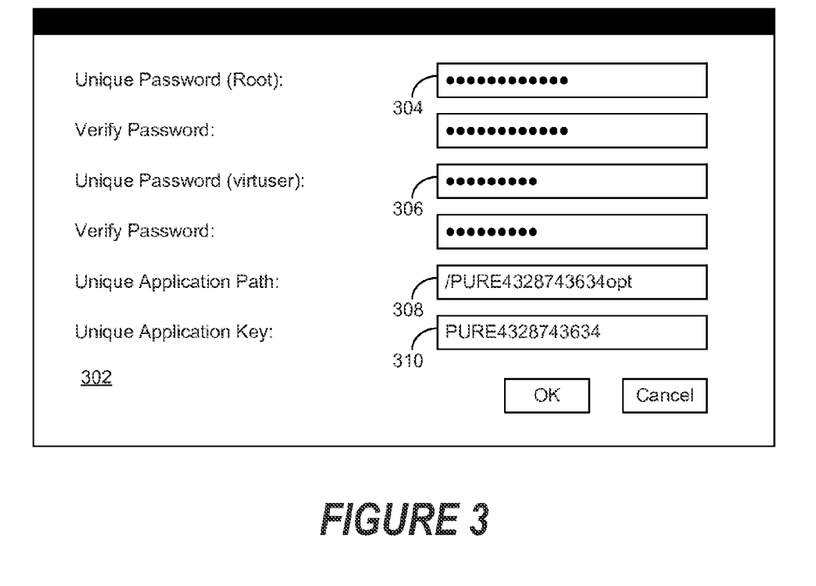
FIG. 3 shows the display of a unique set of randomized system parameters associated with a target node within a user interface (UI) window.

FIG. 3 shows the display of a unique set of randomized system parameters associated with a target node within a user interface (UI) window implemented in accordance with an embodiment of the invention. In this embodiment, a unique set of randomized system parameters that would deter a security attack from affecting multiple machines within a cloud computing environment are displayed within a UI window 302 when a target node is deployed. As shown in FIG. 3, the unique set of randomized system parameters includes a unique root password 304, an associated unique user password 306, a unique application path 308, and an associated unique application key 310.

Figure 4:
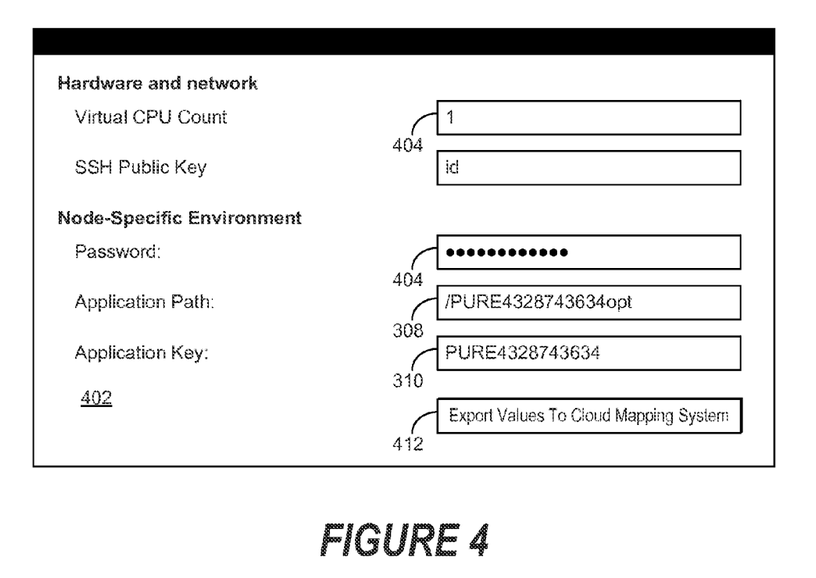
FIG. 4 shows the display of various system settings and unique randomized system parameters associated with a deployed node within a UI window prior to export to a cloud mapping system.

FIG. 4 shows the display of various system settings and unique randomized system parameters associated with a deployed node within a user interface (UI) window prior to export to a cloud mapping system implemented in accordance with an embodiment of the invention. In this embodiment, various system settings and randomized system parameters associated with a deployed cloud computing environment node are displayed within a UI window 402. As shown in FIG. 4, the system settings associated with the deployed node include a virtual CPU count 404 and a SSH public key 406. Likewise, the unique randomized system parameters include a predetermined password 408, an application path 308 and an application key 310. In this embodiment, the parameters and unique environment setting are exported to a cloud mapping system, described in greater detail herein, by selecting the "Export Values To Cloud Mapping System" command button 412 through a user gesture familiar to those of skill in the art.

Figure 5:
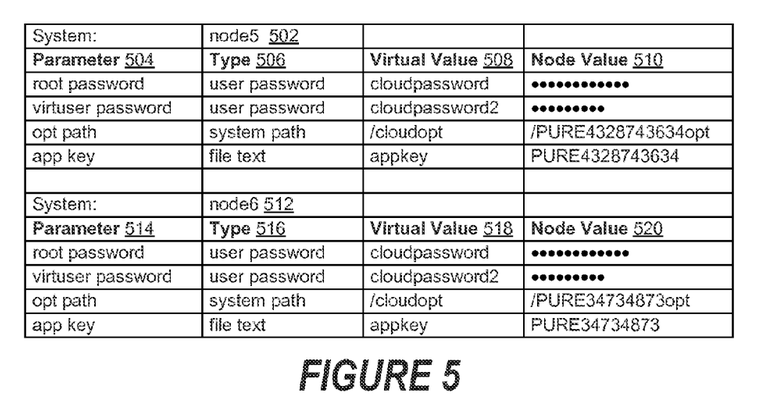
FIG. 5 is a table showing the correlation of a set of generic system parameters to a unique set of randomized system parameters, which are respectively associated with two nodes deployed within a cloud computing environment.

FIG. 5 is a table showing the correlation of a set of generic system parameters to a unique set of randomized system parameters, which are respectively associated with two nodes deployed within a cloud computing environment implemented in accordance with an embodiment of the invention. In this embodiment, systems respectively associated with "node5" 502 and "node6" 512 of the cloud computing environment have corresponding system parameter 504, 514, parameter type 506, 516, generic system parameter value 508, 518, and unique randomized system parameter value 510, 520. For example, as shown in FIG. 5, "node5" 502 has a unique randomized system parameter value 510 of "/PURE4328743634opt" for its /opt path and "PURE4328743634" for its appkey, while "node6" 512 has a unique randomized system parameter value 520 of "/PURE34734873opt" for its /opt path and "PURE34734873" for its appkey. Likewise, both "node5"

502 and "node6" 512 both have the same generic system parameter values 508, 518 of "/cloudopt" for their /opt path.

Figure 6:
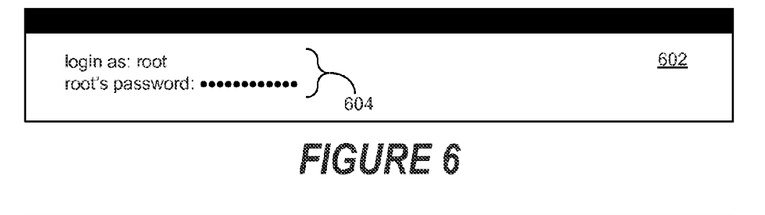
FIG. 6 shows the entry of administrator login credentials within a UI window to access a target node deployed within a cloud computing environment.

FIG. 6 shows the entry of administrator login credentials within a user interface (UI) window implemented in accordance with an embodiment of the invention to access a target node deployed within a cloud computing environment. In this embodiment, an administrator has provided login credentials 604 within a UI window 602. As shown in FIG. 6, the login credentials 604 provided by administrator within the UI window 602 include a login ID as "root," and a password "●●●●●●●●●●●●●" of whose value is not displayed.

As an example, the administrator may enter the generic user password value of "cloudpassword" for the target node (e.g., "node5" 502 or "node6" 512") shown in FIG. 5. In various embodiments, a cloud mapping system, described in greater detail herein, intercepts the entered generic user password of "cloudpassword" and then looks up and enters the corresponding unique randomized password value in the table for the target node. As another example, as likewise shown in FIG. 5, the generic user password of "cloudpassword2" may be entered in place of "cloudpassword." In one embodiment, the substitution of the unique randomized password value for the entered generic user password value is accomplished by using backspaces after the generic user password value is entered. In this embodiment, the value of the unique randomized user password is not displayed to the administrator. In another embodiment, the value of the unique randomized password is buffered before it is provided to the target node. In yet another embodiment, the handling of data at predetermined points, such as password entry, are achieved by a custom implementation of a SSH application. In this embodiment, the method of the custom implementation is a matter of design choice.

Figure 7:
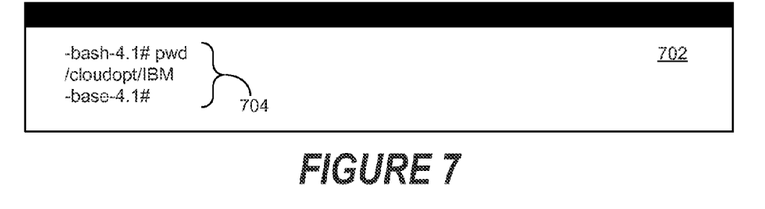
FIG. 7 shows the entry of commands within a UI window to access a target node deployed within a cloud computing environment.

FIG. 7 shows the entry of commands within a user interface (UI) window to access a target node deployed within a cloud computing environment implemented in accordance with an embodiment of the invention. In this embodiment, the administrator enters a series of commands 704 within the UI window 702 to access a target node. As shown in FIG. 7, the series of commands 704 includes the system path command "cd/cloudopt," which once entered is intercepted by a cloud mapping system described in greater detail herein. Once intercepted, the cloud mapping system replaces the generic system parameter path value of "/cloudopt" with the unique randomized system parameter path value of "/PURE4328743634opt" within the system path command, which is then executed. Should the unique randomized system parameter path value of "/PURE4328743634opt" be returned, then the originally-entered generic system parameter path value of "cloudopt" is displayed within the UI window 702.

Figure 8:
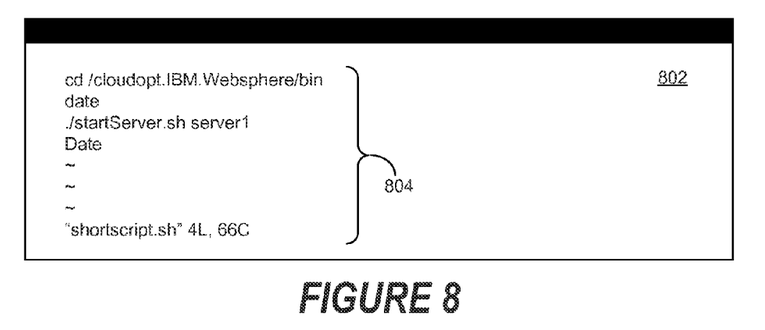
FIG. 8 shows the entry of commands within a UI window to access a target node deployed within a cloud computing environment.

FIG. 8 shows the entry of commands within a user interface (UI) window to access a target node deployed within a cloud computing environment implemented in accordance with an embodiment of the invention. In this embodiment, the administrator enters commands 804 associated with a target node within a user interface (UI) window 802. As shown in FIG. 8, if a file with a unique randomized system parameter value of "/PURE4328743634opt" is edited, for instance through the use of a "vi" editor, then a cloud mapping system, described in greater detail herein, remaps the unique randomized system parameter value of "/PURE4328743634opt" to the generic system parameter value of "cloudopt," which is then displayed within the UI window 802.

In one embodiment, backspaces are used to enter the unique randomized system parameter file path of "/PURE4328743634opt" when the user (e.g., an administrator) enters the generic system parameter file path value "cloudopt." In this embodiment, the modification may affect some related values, such as the column number, so any such associated effect of this embodiment may require some awareness by the user. In another embodiment, the system is scanned for modified files and all instances of "cloudopt" are changed into "PURE4328743634opt" when either the cloud mapping system is closed, or after every command run by a user.

In yet another embodiment, the user (e.g., an administrator) is informed whenever a mapping operation needs to be performed. In one embodiment, the cloud mapping system alerts the user any time they enter a generic system parameter value such as "/cloudopt." In this embodiment, the user is responsible for running a conversion after the file has been edited. For example, the cloud mapping system may load simple "convert.sh" and "unconvert.sh" scripts onto the system when the user logs in, which the user would then run after and before editing a file. In still another embodiment, the shell environment is modified to automatically inject "convert.sh" and "unconvert.sh" steps for specific commands, such as "vi" and "sed" and so forth. Skilled practitioners of the art will realize that many such embodiments are possible and the foregoing is not intended to limit the spirit, scope or intent of the invention.

Figures 9, 10:
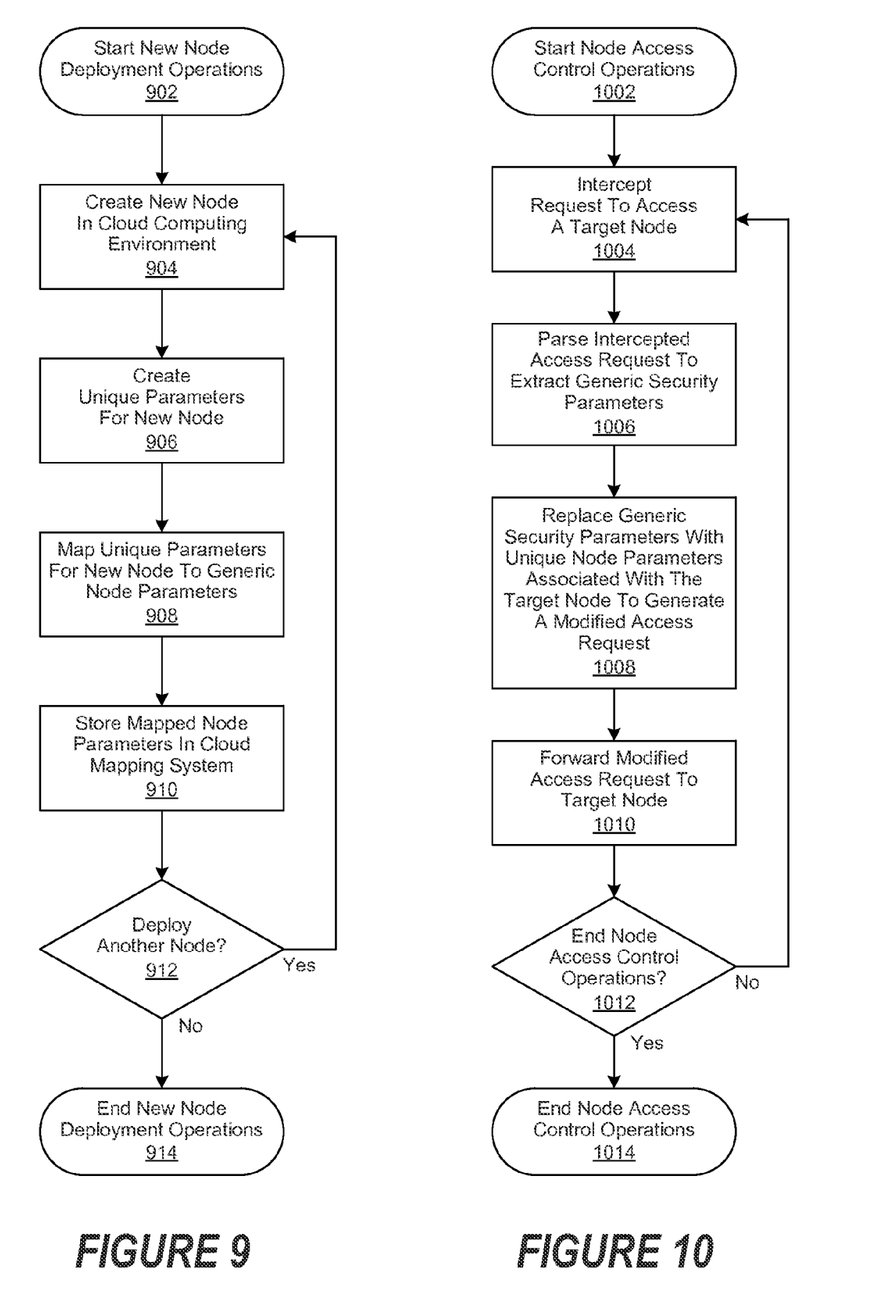
FIG. 9 is a generalized flow chart of operations performed to deploy a new node within a cloud computing environment.
FIG. 10 is a generalized flow chart of operations performed to control access to a new node deployed within a cloud computing environment.

FIG. 9 is a generalized flow chart of operations performed to deploy a new node within a cloud computing environment implemented in accordance with an embodiment of the invention. In this embodiment, new node deployment operations are begun in step 902, followed by the creation of a new node in the cloud computing environment in step 904. In various embodiments, the newly-created node is based upon a common image and is configured to be homogeneous with other nodes deployed within the cloud computing environment.

A unique set of randomized system parameters is then generated for the new node in step 906 as described in greater detail herein. In various embodiments, the unique set of randomized system parameters may include a unique root password and /opt path. The resulting unique set of randomized system parameters for the new node are then mapped in step 908 to a set of generic system parameters, as described in greater detail herein. Then, in step 910, the mapped sets of system parameters are stored in a cloud mapping system, as likewise described in greater detail herein. A determination is then made in step 912 whether to deploy another node in the cloud computing environment. If so, the process is continued, proceeding with step 904. Otherwise, new node deployment operations are ended in step 914.

FIG. 10 is a generalized flow chart of operations performed to control access to a new node deployed within a cloud computing environment implemented in accordance with an embodiment of the invention. In this embodiment, node access control operations are begun in step 1002, followed by the interception of a request to access a target node in step 1004. The intercepted access request is then parsed in step 1006 to extract a set of generic system parameters.

Then, in step 1008, the set of generic system parameters is then replaced with a unique set of randomized system parameters associated with the target node to generate a modified access request, which is then forwarded to the target node in step 1010. A determination is then made in step 1012 whether to end node access control operations. If not, then the process is continued, proceeding with step 1004. Otherwise, node access control operations are ended in step 1014.

Although the present invention has been described in detail, it should be understood that various changes, substitutions and alterations can be made hereto without departing from the spirit and scope of the invention as defined by the appended claims.

What is claimed is:

1. A system comprising:
a processor;
a data bus coupled to the processor; and
a computer-usable medium embodying computer program code, the computer-usable medium being coupled to the data bus, the computer program code used for controlling access in a cloud environment and comprising instructions executable by the processor and configured for:
mapping a unique set of randomized system parameters to a set of generic system parameters, the unique set of randomized system parameters comprising a unique randomized root password value, a unique randomized virtual user password value, an opt path value and an app key value, the set of generic system parameters comprising a generic root user password, a generic virtual user password value, an opt path value and an app key value;
receiving a request to access a resource in the cloud environment, the request including the set of generic system parameters;
intercepting the request and replacing the set of generic system parameters with the unique set of randomized system parameters to produce a modified request; and
forwarding the modified request for access to the resource.

2. The system of claim 1, further comprising:
selecting the randomized system parameters for a node of the cloud environment; and
deploying the node using the randomized system parameters.

3. The system of claim 1, further comprising:
intercepting a response from the resource containing at least a portion of the unique set of randomized system parameters; and
replacing the portion with a corresponding portion of the set of generic system parameters.

4. The system of claim 1, further comprising:
changing the unique set of randomized system parameters at the resource to a temporary set of system parameters for a duration of a user session.

5. The system of claim 1, further comprising:
resetting the unique set of randomized system parameters for a set of resources in the cloud environment.

6. The system of claim 5 wherein:
the unique set of randomized system parameters are reset for all resources in the cloud environment.

7. A non-transitory, computer-readable storage medium embodying computer program code, the computer program code comprising computer executable instructions configured for:
mapping a unique set of randomized system parameters to a set of generic system parameters, the unique set of randomized system parameters comprising a unique randomized root password value, a unique randomized virtual user password value, an opt path value and an app key value, the set of generic system parameters comprising a generic root user password, a generic virtual user password value, an opt path value and an app key value;
receiving a request to access a resource in the cloud environment, the request including the set of generic system parameters;
intercepting the request and replacing the set of generic system parameters with the unique set of randomized system parameters to produce a modified request; and
forwarding the modified request for access to the resource.

8. The non-transitory, computer-readable storage medium of claim 7, further comprising:
selecting the randomized system parameters for a node of the cloud environment; and,
deploying the node using the randomized system parameters.

9. The non-transitory, computer-readable storage medium of claim 7, further comprising:
intercepting a response from the resource containing at least a portion of the unique set of randomized system parameters; and
replacing the portion with a corresponding portion of the set of generic system parameters.

10. The non-transitory, computer-readable storage medium of claim 7, further comprising:
changing the unique set of randomized system parameters at the resource to a temporary set of system parameters for a duration of a user session.

11. The non-transitory, computer-readable storage medium of claim 7, further comprising:
resetting the unique set of randomized system parameters for a set of resources in the cloud environment.

12. The non-transitory, computer-readable storage medium of claim 11, wherein:
the unique set of randomized system parameters are reset for all resources in the cloud environment.

13. The non-transitory, computer-readable storage medium of claim 7, wherein the computer executable instructions are deployable to a client system from a server system at a remote location.

14. The non-transitory, computer-readable storage medium of claim 7, wherein the computer executable instructions are provided by a service provider to a user on an on-demand basis.

* * * * *